June 11, 1940.                A. I. CAQUOT                2,204,472
                              VIBRATING DEVICE
                             Filed May 11, 1939
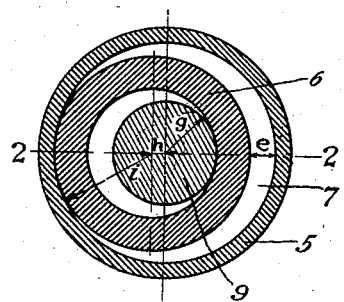
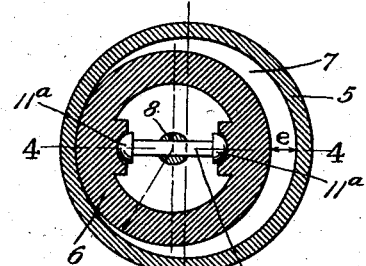
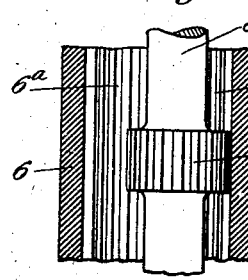
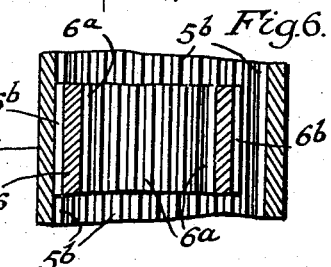
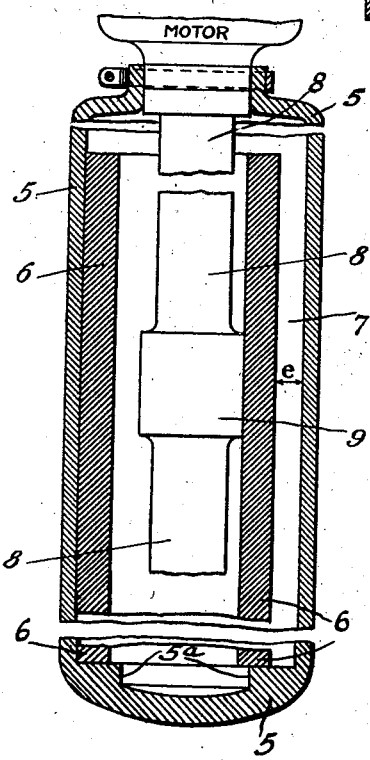
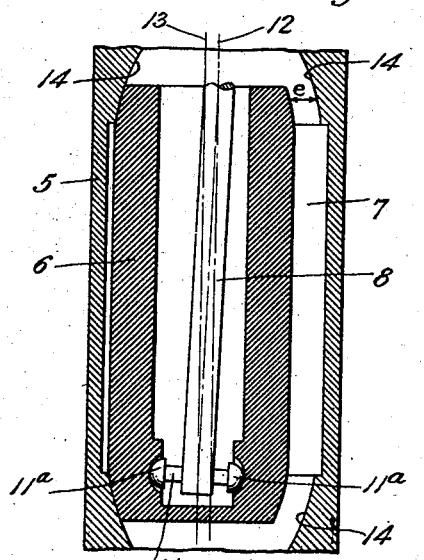
Inventor
ALBERT IRÉNÉE CAQUOT
By Dowell & Dowell
Attorneys Patented June 11, 1940

2,204,472

UNITED STATES PATENT OFFICE 2,204,472

VIBRATING DEVICE

Albert Irénée Caquot, Paris, France

Application May 11, 1939, Serial No. 273,152
In France May 20, 1938

7 Claims. (Cl. 259—1)

This invention relates to vibrating devices or the like, having reference more especially to those of the type involving or embodying an eccentric cylindrical rotation.

The primary object of the invention is to provide an improved vibrating device of the stated type or character, designed for use particularly in the compacting, solidification or other treatment of concrete and the like masses, but it is not so limited, nor intended to be, inasmuch as the invention is applicable in principle also to various other devices of the kind intended for other and different uses or purposes.

Among other objects incident to the primary object, it is aimed to increase the efficiency of devices vibrating with an eccentric element rotation, by increasing the weight or mass of the component parts or certain ones thereof, by increasing the vibration frequency and transmitting the effects of vibration directly to the outer member or casing, and by adapting the bearings of the driving member or shaft to receive and to necessarily sustain only relatively small speeds and strains.

Other objects, as well as the general concept and particular advantages of the invention, will be stated or inferentially made to appear in the specification which follows.

For best understanding of the invention and possible variations or modifications thereof, further description of the same will be made with reference to the appended drawing, illustrating, somewhat diagrammatically and as examples merely, two practicable embodiments thereof in a device for vibrating concrete or other mass material.

In said drawing:

Fig. 1 represents a transverse cross-section of a vibrating device having a friction drive;

Fig. 2 represents a longitudinal section of the same device, taken centrally on the line 2—2 of Fig. 1;

Fig. 3 similarly to Fig. 1 represents a transverse cross-section of a device having a direct drive;

Fig. 4 similarly to Fig. 2 represents a longitudinal section of the last named device, taken on the line 4—4 of Fig. 3 and showing a special provision for the stabilization of the cylindrically rotated working member;

Fig. 5 is a fragmentary view, on a reduced scale, illustrating a modification of Fig. 2; and Fig. 6 is a fragmentary view on a reduced scale, similar to Fig. 5, illustrating another modification of Fig. 2.

Referring first to Figs. 1 and 2, the outer member or casing is a stationary element formed by the cylinder 5, which of course will be of an outer and inner diameter suitable for the purpose for which the device is intended. The same is represented in clamped attachment to another stationary or non-rotatable part, later mentioned, from which it may be supported, but this is intended to be merely illustrative and both its support and attachment may be by some other means or arrangement, the primary purpose being to suspend it in a mixture of concrete or the like. It is closed at top and bottom as represented in Fig. 2 and is of course made detachable or in sections (not shown) so as to permit assemblage with other parts. Although said cylinder is shown to be of true cylinder form, it will be understood that it may if desired be polygonal or elliptical or of some other shape, especially on the outer side.

Within said outer casing or cylinder is another cylinder or the equivalent member 6, occupying substantially the entire inner space thereof and constituting a planetary movable or rolling element which may be characterizingly called a "waltzer." The size and weight of this second cylinder will of course be limited to some extent by the inner diameter of the first or outer stationary cylinder, but it is intended to be of such relative size or outer diameter as to leave a fairly liberal crescent shaped space 7 between the walls of the two cylinders when said inner one contacts the outer one at any point or side. This crescent shaped space measures or corresponds to the eccentricity of the one member within the other, or in other words determines the possible movement of the inner one in respect to the outer. The weight of said inner cylinder and therefore its force or intensity of movement depends upon the thickness of its walls and the material of which it is made. It is preferred ordinarily to have a relatively greater weight than the outer cylinder and accordingly is shown formed with a relatively thicker wall.

Within said second or inner planetary cylinder extends a drive shaft 8 eccentric with respect thereto but concentric with respect to the first or outer cylinder 5. This shaft carries a friction head or drum 9 having a rough grained, pitted or knurled surface bearing against the inner peripheral surface of the inner planetary cylinder so as to transmit rotation to the latter, whose said inner surface for such purpose may expediently be made rough, grained, pitted or knurled (corresponding to the friction head itself) so as to promote the frictional contact of the two parts.

More than one of said heads may of course be used or the single one shown may be elongated to contact a wider surface of the cylinder, the primary purpose being merely to provide an effective (positive) drive of the one by the other. Instead of the frictional or mere surface-contact drive shown and just described, a gearing or some other drive may if preferred be used, such for instance as illustrated in the modificational Fig. 5, wherein ribs 6ª corresponding to gear teeth are provided on the inner surface of the cylinder 6 to engage the teeth of a gear 10 carried by the drive shaft 8 in place of the frictional head or drum 9. Actually a gear drive as just described is generally preferable and will in most cases be used, the mesh or tooth interlock between the parts being deep enough to keep them normally engaged against shift or shaking apart. Of course it will be understood that this gear drive may be substituted with bevel or some other form of gears, or that the equivalent may with equal effectiveness be used. Said drive shaft 8 receives its drive from an outside source in any suitable manner, as represented elementarily in Fig. 2, and is supported in suitable bearings (not shown).

The described device operates in a manner which will probably be apparent from the constituted organization. Rotational drive imparted to the shaft 8 is transmitted to the inner cylinder 6 and causes said inner cylinder to rotate and roll circumferentially upon the inner periphery or wall of the outer cylinder or casing 5, either by frictional contact or by a toothed engagement (not shown) therewith such as the frictional drive or toothed engagement between the inner periphery of said inner member and the driving head 9 of the driving shaft. Fig. 6 illustrates a positive drive between the inner cylinder 6 and the outer casing 5, similarly to the positive drive between said inner cylinder and its driving shaft 8 shown in Fig. 5. In said Fig. 6, ribs 5ᵇ corresponding to gear teeth are provided on the inner surface of the outer casing 5 to engage corresponding ribs or teeth 6ᵇ on the outer surface or periphery of the member 6. In other words, the inner cylinder 6 being driven in one direction by the driving shaft 8 simultaneously rolls in the opposite or counter direction upon the inner periphery of the outer cylinder, due to the frictional contact or toothed engagement with said outer cylinder which resists the drive and thereby causes the roll in opposite direction. The inner cylinder 6 takes a planetary or what may be defined as an epicycloidal movement around the central axis of the outer cylinder, increasing the vibration frequency in ratio with the rotational drive of the shaft 8 and in proportion with the ratio between the external diameter of the inner cylinder 6 and the inner diameter of the casing 5. The intensity of this vibration will depend upon the speed of the rotational drive as well as the weight and size of said eccentrically moving member, which of course bears with a certain pressure or centrifugal force against the outer cylinder or casing and revolves its entire outer circumferential extent upon and innerly around said cylinder. In the arrangement of the parts to thus function, no pressure or thrust is imposed directly upon the driving shaft bearings, which accordingly are relieved of excessive stress or strain.

If V is taken to represent the angular velocity of 9, having a radius represented by $g$, the angular velocity of the planetary or weight member 6, having a rotating radius represented by $i$ which is eccentric (through the space 7) by the extent or distance represented by $h$, will be equal to that which is expressed and may be determined by the following formula, viz—

$$V \times \frac{g}{h} \times \frac{i}{g+h+i}$$

The supported rotation of the member 6 on the inner periphery or circumference of the member 5 will of course be understood to occur upon or along the full extent or area of their surface contact or meeting, which may be made to extend the entire length of the one within the other or to exist only at spaced intervals along such length. The same applies as well to the driving head 9 on the shaft 8 with respect to said inner member 6. Both may be made in single length piece as shown, or in sections, depending upon the overall length of desired construction or preference.

It should here be stated that the inner or planetary cylinder is retained against longitudinal displacement (within the outer cylinder) by opposite end abutments such as represented by the wall ring or flange 5ª on the inner side of the outer cylinder. Any tendency to move appreciably in an endwise or longitudinal direction is resisted by these or the like end abutments which retain the member within definite limits of endwise movement but in no way retard the rolling or rotary movement within said outer cylinder. The deep interlocking tooth mesh of the parts, one with the other, prevents said parts from disengaging laterally under normal working conditions. However, if a jar should shift and disengage them sufficiently to throw them out of operation, a mere tilt or strike at one side will throw them again into engagement. Once the planetary member is operatively engaged with the driving shaft or head, centrifugal force will throw it instantly into rolling engagement with the outer cylinder. The parts tend to hold this operative engagement with respect to each other and only a severe shock or jar will be capable of shifting them out of such engagement.

Referring now to Figs. 3 and 4, these two views illustrate an alternative or modificational form of construction in which the drive of the planetary weight member 6 is attained in a different way and the vibration frequency is increased. In this modificational structure, as in the other, the inner cylinder is caused to rotate and roll upon the inner periphery of the outer cylinder or casing 5, either by friction or the effect of a toothed gear-like engagement therewith, but the actual rotation or drive around a central axis (i. e. concentric to said outer member) is transmitted by means of a flexible connection with the driving shaft 8 in place of the friction head 9 or gearing previously described. Said flexible connection has the form of a universal or double-joint coupling in what may be called a "Cardan" drive. It is shown to consist of a transverse pin 11 carried by said shaft 8, which in this instance is not concentric with or retained wholly in the axis of the outer casing member. Said pin is provided with rounded heads 11ª on opposite extremities fitting into receptive recesses in the wall of the driven member and by which it imparts rotation thereto as a key on its shaft.

This transmission contemplates a certain play or swing of the driving shaft 8 around the central axis of the outer casing member, which axis is indicated by the line 12. Offset therefrom, the central axis of the inner eccentric member 6 is indicated by the line 13. As viewed in Fig. 4 the driving shaft will be seen to assume a slight inclination with respect to both of said lines passing or extending therethrough, provision therefor being made as by a ball socket (not shown) centered in the top or head end of the stationary casing member of the device. It will be understood that the offset distance between the two axis lines corresponds to the eccentricity of the inner planetary member with respect to the outer cylinder or casing part.

If N is taken to represent the angular velocity of shaft 8 and the planetary member 6, $i$ the rotating radius of said member 6, and $e$ the total eccentricity, the angular velocity of rotation of the center axis 13 of said member 6 around the center axis 12 of the stationary casing cylinder 5 would be $$\frac{2Ni}{e}$$

Consequently, the frequency is divided by the ratio $$\frac{2i}{e}$$

which may be as great as desired.

While the modified drive transmission described is probably the most simple and effective of that type, it will be understood that its equivalent in some other form of flexible connection, joint or coupling may if preferred be used. This might comprise a combination of the known other forms or parts thereof, the purpose and result being the same regardless of the specific connection employed.

Said modified structure of the device also provides for an improved stability of the inner planetary member 6 in its eccentric action or roll upon the outer casing member or cylinder 5, which may be employed as well in the first described structure or form of the device. Again referring to Fig. 4, the ends of said outer casing member are shown formed with shoulder portions 14 on the inner side which are substituted for the end abutments 5a and which are inclined or tapered conically, in this instance with a slight arcuation or concavity, to provide surfaces upon and against which the ends of said inner member, correspondingly tapered, will bear and work in operation instead of applying its full length extent against the side wall of the outer member.

This arrangement not only provides more solid (thickened) surfaces on which the inner member operates, but also slightly decreases the extent or circumferential radius of its eccentric movement or roll and therefore serves to accurately center the inner member therewithin, which latter member places itself in such a position that any longitudinal reactions caused by its weight and centrifugal force are counterbalanced or absorbed by the component force caused by the angle of the tapered bearings or surfaces of enlarged density upon which it rolls.

The advantages of a device of this inventive concept are believed to be apparent and sufficiently indicated by the foregoing description in which various objects have been explained. It will be appreciated that the device, illustrated in two embodiment forms, may be made in various other forms to suit various purposes and conditions, and that different forms and arrangements of its parts, with different combinations and subcombinations thereof, may be employed in varied or modified constructions of the same, without departing from the spirit and scope of this invention. Therefore it is not intended to limit the invention to the specific forms illustrated herewith, nor otherwise to impose any limitations thereon other than may be required by the prior art or as are specifically set forth in the appended claims.

Having thus described my invention, what I claim as new and desire to secure by Letters Patent of the United States is:

1. A vibrating device, comprising an outer cylindric stationary casing member, an inner cylindric eccentrically disposed "planetary" member adapted to rotate with a roll upon and around the inner periphery or wall of said casing member, the said "planetary" member having an intermeshing outer periphery engagement with said inner periphery of the casing member, and a rotary driving means disposed within and having an intermeshing drive engagement with the inner wall of said "planetary" member for rotating the same in rolling movement upon and around the said inner periphery or wall of the casing member, the said rolling movement being in a direction counter to that in which the "planetary" member itself is rotatably driven.

2. A vibrating device, comprising an outer cylindric stationary casing member, an inner cylindric eccentrically disposed "planetary" or vibration-generative member adapted to rotate with a roll in orbital movement against and around the inner periphery or wall of said casing member, the said "planetary" member having an outer peripheral intermeshing engagement with said inner periphery of the casing member, and a rotary driving shaft disposed within said "planetary" member and having an intermeshing drive connection with the inner wall of said member for rotating the same in its orbital rolling movement against and around said inner periphery or wall of the casing member, the said orbital movement of the "planetary" member being in a direction counter to that in which said member is itself rotated and causing the axis thereof to describe a cylindrical path around the central axis of the casing member.

3. A vibrating device, comprising an outer cylindric stationary casing member, an inner cylindic eccentrically disposed "planetary" member adapted to rotate with a roll in orbital movement upon and around the inner periphery or wall of said casing member, the said "planetary" member having an intermeshing outer periphery engagement with said inner periphery of the casing member, and a rotary driving shaft eccentrically disposed within said "planetary" member upon the central axis of the casing member and having an inward lateral intermeshing engagement with said "planetary" member for rotating the same with a roll in its orbital movement upon and around the said inner periphery or wall of the casing member around said central axis of the latter; said roll or orbital movement being in a direction opposite to that in which the "planetary" member itself is rotated by said driving shaft.

4. A vibrating device according to claim 1, wherein the intermeshing drive engagement of the driving means with said "planetary" member comprises a gear connection of the one with the other which is capable of driving said "planetary" member at a speed to produce vibration which is always greater than the rotational speed of the driving means itself.

5. A vibrating device according to claim 1, wherein the positive drive engagement of the driving means with said "planetary" member comprises a flexible joint or the equivalent connection of the one with the other providing a form of "Cardan" drive therewith.

6. A vibrating device according to claim 1, wherein the outer casing member is provided on its inner side or wall at opposite ends thereof with oppositely tapering bearing surfaces upon which the ends of the "planetary" member work in its rotational and rolling movement therewithin instead of full length against the intermediate sides of the casing member and by which said "planetary" member is maintained longitudinally displaceable within definite opposite limits.

7. A vibrating device according to claim 1, wherein the outer casing member is provided on its inner side or wall at opposite ends thereof with oppositely inclined or tapered bearing surfaces formed by shoulders and said surfaces being either straight or arcuated concavitally upon which the ends of the "planetary" member formed correspondingly work in its rotational and rolling movement within said casing member instead of full length against the intermediate side walls of the casing member and thus determine or establish the necessary forces to ensure stability of said "planetary" member.

ALBERT IRÉNÉE CAQUOT.